United States Patent
Kim et al.

(10) Patent No.: US 12,536,654 B2
(45) Date of Patent: Jan. 27, 2026

(54) SYSTEM AND METHOD FOR STOOL IMAGE ANALYSIS

(71) Applicant: KYUNGPOOK NATIONAL UNIVERSITY INDUSTRY-ACADEMIC COOPERATION FOUNDATION, Daegu (KR)

(72) Inventors: Eun Soo Kim, Daegu (KR); Sung Moon Jeong, Daegu (KR); Dong Won Woo, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 295 days.

(21) Appl. No.: 18/220,022

(22) Filed: Jul. 10, 2023

(65) Prior Publication Data

US 2024/0020832 A1    Jan. 18, 2024

(30) Foreign Application Priority Data

Jul. 12, 2022    (KR) .................. 10-2022-0085663

(51) Int. Cl.
*G06K 9/00*    (2022.01)
*G06T 7/00*    (2017.01)
(Continued)

(52) U.S. Cl.
CPC .............. *G06T 7/0012* (2013.01); *G06T 7/11* (2017.01); *G06T 7/60* (2013.01); *G06T 2207/20081* (2013.01); *G06T 2207/20132* (2013.01)

(58) Field of Classification Search
CPC . G06T 2207/10068; G06T 2207/20081; G06T 2207/20084; G06T 2207/20132;
(Continued)

(56) References Cited

U.S. PATENT DOCUMENTS

| 11,604,177 B1* | 3/2023 | Park ........................ G06T 7/90 |
| 2008/0273781 A1* | 11/2008 | Manduca ................ G06T 5/30 |
| | | 382/131 |

(Continued)

FOREIGN PATENT DOCUMENTS

| JP | 2016-066301 A | 4/2016 |
| JP | 2021-192024 A | 12/2021 |

(Continued)

OTHER PUBLICATIONS

Office Action dated Mar. 21, 2025, issued to Korean Application No. 10-2022-0085663.

(Continued)

*Primary Examiner* — Avinash Yentrapati
(74) *Attorney, Agent, or Firm* — Stein IP, LLC

(57) ABSTRACT

Disclosed are a system and method for analyzing a stool image, which derive the state of the large intestine of a user by analyzing a stool image by using a pre-trained deep learning model. The system for analyzing a stool image may include an input unit configured to receive stool images of a user, a data set generation unit configured to generate a data set by grouping the stool images in chronological order, an analysis unit configured to derive information on a stool state of the user or information on a state of the large intestine of the user by analyzing the data set, and an output unit configured to output the information on the stool state or the information on the state of the large intestine. The (Continued)

endoscopic activity of ulcerative colitis can be predicted from a camera image of stool even without performing a colonoscopy.

11 Claims, 9 Drawing Sheets

(51) Int. Cl.
*G06T 7/11* (2017.01)
*G06T 7/60* (2017.01)

(58) Field of Classification Search
CPC ......... G06T 2207/30028; G06T 7/0012; G06T 7/11; G06T 7/60
See application file for complete search history.

(56) References Cited

U.S. PATENT DOCUMENTS

| | | | | |
|---|---|---|---|---|
| 2010/0246912 | A1* | 9/2010 | Periaswamy | G06T 7/0012 |
| | | | | 382/128 |
| 2011/0206250 | A1* | 8/2011 | McGinnis | G06T 7/0012 |
| | | | | 382/128 |
| 2021/0151137 | A1* | 5/2021 | Zedayko | G16H 20/30 |
| 2021/0265059 | A1 | 8/2021 | Paineau et al. | G16H 50/20 |
| 2022/0375080 | A1* | 11/2022 | Aoyama | G06V 10/764 |
| 2023/0085953 | A1* | 3/2023 | Mori | A61B 5/6887 |
| | | | | 348/148 |
| 2023/0117389 | A1* | 4/2023 | Kanai | G06T 7/90 |
| | | | | 382/128 |
| 2023/0122501 | A1* | 4/2023 | Kanai | G06T 7/11 |
| | | | | 382/128 |
| 2023/0360206 | A1* | 11/2023 | Kanai | G01N 33/493 |
| 2024/0020832 | A1* | 1/2024 | Kim | G06T 7/0012 |
| 2024/0087114 | A1* | 3/2024 | Takaki | G06T 7/62 |
| 2025/0148589 | A1* | 5/2025 | Tomishima | G06T 7/0012 |

FOREIGN PATENT DOCUMENTS

| | | |
|---|---|---|
| KR | 10-2268304 B1 | 6/2021 |
| WO | WO 2021/258033 A1 | 12/2021 |

OTHER PUBLICATIONS

Japanese Office Action dated Apr. 30, 2024, issued to Application No. 2023-079401.
AB Poster published on May 14, 2022.

\* cited by examiner (a)

(b)

SYSTEM AND METHOD FOR STOOL IMAGE ANALYSIS

CROSS-REFERENCE TO RELATED APPLICATIONS

This application claims the benefit of Korean Application No. 10-2022-0085663 filed on Jul. 12, 2022, in the Korean Intellectual Property Office. All disclosures of the document named above are incorporated herein by reference.

BACKGROUND

1. Technical Field

The present disclosure relates to a system and method for analyzing a stool image, and more particularly, to a system and method for analyzing a stool image, which derive the state of the large intestine of a user by analyzing a stool image of the user by using a pre-trained deep learning model.

2. Related Art

Ulcerative colitis is a chronic inflammatory intestinal disease of unknown cause characterized in inflammation limited to a mucous membrane or submucous layer of the large intestine, and is characterized in that ulcerative colitis continuously invades the large intestine from the rectum and all pathologic alterations are connected without being scattered here and there.

Furthermore, ulcerative colitis is a disease that inveterately generates inflammation in the large intestine, and requires ongoing drug treatment. If inflammation is not adjusted through the drug treatment, a problem, such as hospitalization, intestine resectional surgery, or an increased risk of developing of colorectal cancer, may occur.

In order to prevent the developing of a disease, such as colorectal cancer, it will be preferred that a health state of the large intestine is periodically monitored. In particular, in the case of a patient with ulcerative colitis who has a high risk of developing of colorectal cancer, it is essential to periodically monitor the state of the large intestine.

Conventionally, the state of the large intestine of a patient is monitored through a method, such as measuring the inflammation activity of a mucous membrane through a colonoscopy. However, a colonoscopy has problems in that sleep anesthesia is required according to circumstances, relatively large amounts of time and money are required, a serious side effect such as perforation or infection may occur, and the colonoscopy is not frequently performed compared to its necessity because a testee is made to feel a strong sense of discomfort.

Accordingly, there is a need to develop a technology for monitoring the state of the large intestine, which requires small amounts of time and money and can also reduce inconvenience that is felt by a testee.

PRIOR ART DOCUMENT

Patent Document (Patent Document 001) KR 10-2268304 B1

SUMMARY

Various embodiments are directed to a system and method for analyzing a stool image, which can analyze the state of the large intestine of a user by using a stool image of the user and a deep learning model.

As an embodiment of the present disclosure, there is provided a system for analyzing a stool image.

The system for analyzing a stool image according to an embodiment of the present disclosure may include an input unit configured to receive stool images of a user, a data set generation unit configured to generate a data set by grouping the stool images in chronological order, an analysis unit configured to derive information on a stool state of the user or information on a state of the large intestine of the user by analyzing the data set, and an output unit configured to output the information on the stool state or the information on the state of the large intestine.

In the system for analyzing a stool image according to an embodiment of the present disclosure, the data set ray include the stool images for seven days right after a colonoscopy for the user.

The system for analyzing a stool image according to an embodiment of the present disclosure may further include a pre-processing unit configured to crop the stool image based on a specific point of a toilet included in the stool image.

In the system for analyzing a stool image according to an embodiment of the present disclosure, the pre-processing unit may extract the specific point of the toilet from the stool image and crop the stool image so that any one of edges of the stool image includes the specific point of the toilet.

The system for analyzing a stool image according to an embodiment of the present disclosure may further include a user terminal including a display unit and a communication unit configured to transmit and receive the stool images. The display unit may include a guide line for being matched with a specific point within a toilet.

In the system for analyzing a stool image according to an embodiment of the present disclosure, the analysis unit may include a deep learning model that has been pre-trained by using the stool images or the data set as input data and using the information on the stool state or the information on the state of the large intestine as output data.

In the system for analyzing a stool image according to an embodiment of the present disclosure, when the information on the state of the large intestine is a discontinuous value indicative of a degree of the state of the large intestine of the user, the pre-trained deep learning model may perform learning by using a loss function corresponding to a classification problem.

In the system for analyzing a stool image according to an embodiment of the present disclosure, when the information on the state of the large intestine is a continuous value indicative of a specific numeral value, the pre-trained deep learning model may perform learning by using a loss function corresponding to a linear regression problem.

As an embodiment of the present disclosure, there is provided a method of analyzing a stool image.

The method of analyzing a stool image according to an embodiment of the present disclosure may include an input step of receiving, by an input unit, stool images of a user, a data set generation step of generating, by a data set generation unit, a data set by grouping the stool images in chronological order, an analysis step of deriving, by an analysis unit, information on a stool state or state of the large intestine of the user by analyzing the data set, and an output step of outputting, by an output unit, the information on the stool state or the information on the state of the large intestine.

In the method of analyzing a stool image according to an embodiment of the present disclosure, the data set may include the stool images for seven days right after a colonoscopy for the user.

The method of analyzing a stool image according to an embodiment of the present disclosure may further include a pre-processing step of cropping, by a pre-processing unit, the stool image based on a specific point included in the stool image.

In the method of analyzing a stool image according to an embodiment of the present disclosure, the pre-processing step may include a reference extraction step of extracting, by the pre-processing unit, a specific point of a toilet from the stool image and a cropping step of cropping, by the pre-processing unit, the stool image so that any one of edges of the stool image may further include the specific point of the toilet.

The method of analyzing a stool image according to an embodiment of the present disclosure may further include a transmission and reception step of transmitting and receiving, by a communication unit, the stool images to and from a user terminal including a display unit and a guide line indication step of displaying, by the display unit, a guide line for being matched with a specific point within a toilet.

The method of analyzing a stool image according to an embodiment of the present disclosure ray further include a training step of training a deep learning model by using the stool images or the data set as input data and using the information on the stool state or the information on the state of the large intestine as output data.

In the method of analyzing a stool image according to an embodiment of the present disclosure, in the training step, the deep learning model may be trained by using a loss function corresponding to a classification problem when the information on the state of the large intestine is a discontinuous value indicative of a degree of the state of the large intestine of the user.

In the method of analyzing a stool image according to an embodiment of the present disclosure, in the training step, the deep learning model may be trained by using a loss function corresponding to a linear regression problem when the information on the state of the large intestine is a continuous value indicative of a specific numeral value.

As an embodiment of the present disclosure, there is provided a computer-readable recording medium on which a program for implementing the aforementioned method has been recorded.

According to an embodiment of the present disclosure, it is possible to predict the endoscopic activity of ulcerative colitis from a camera image of stool even without performing a colonoscopy.

Furthermore, according to an embodiment of the present disclosure, it is possible to monitor the state of the large intestine of a user by using a simple method of capturing a stool image of the user even at home even though the user does not visit a hospital.

Furthermore, according to an embodiment of the present disclosure, there is an advantage in that even a user who cannot move very well or who resides at a place where access to a hospital is not easy can monitor the state of his or her large intestine.

Effects of the present disclosure which may be obtained in the present disclosure are not limited to the aforementioned effects, and other effects not described above may be evidently understood by a person having ordinary knowledge in the art to which the present disclosure pertains from the following description.

DETAILED DESCRIPTION

Figure 1:
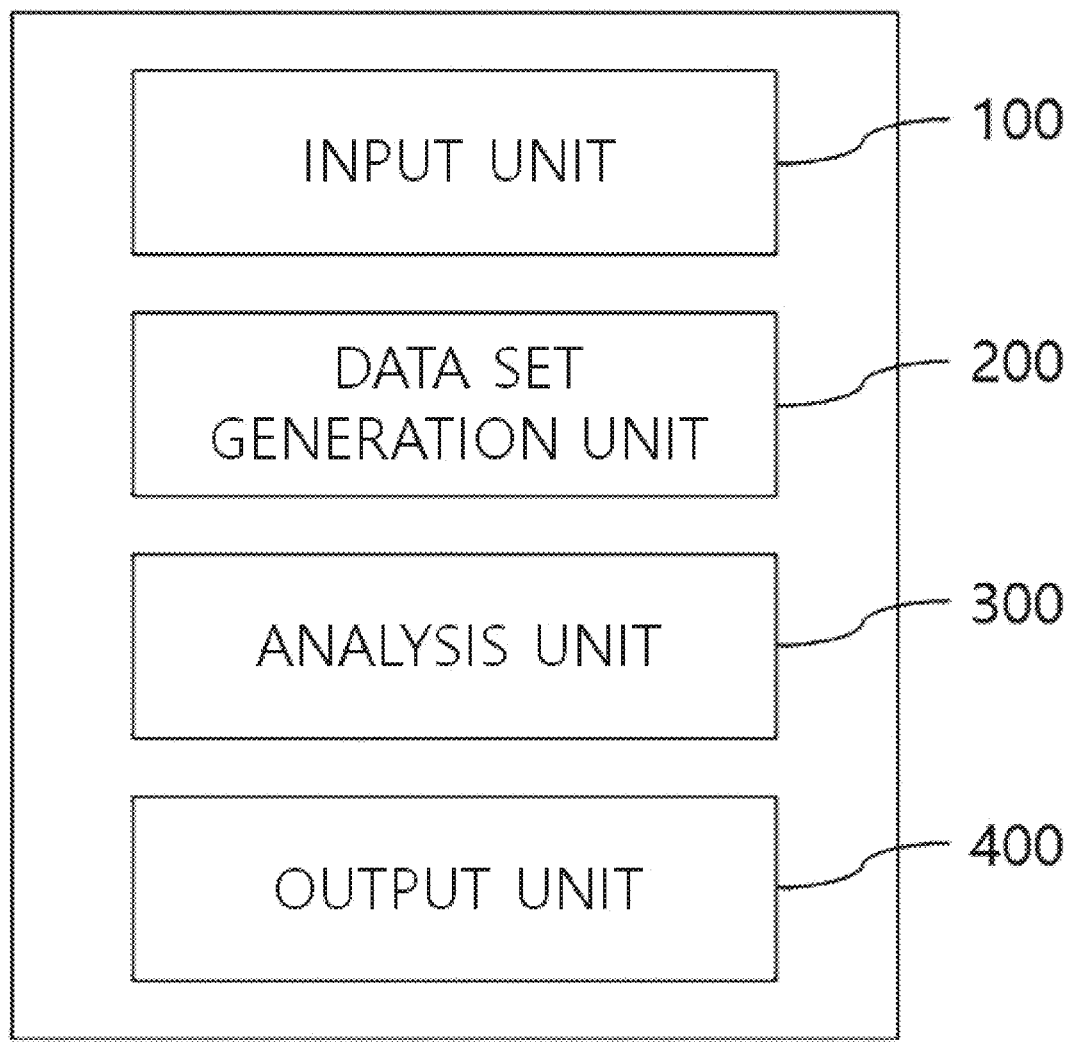
FIG. 1 is a block diagram of a system for analyzing a stool image according to an embodiment of the present disclosure.

Embodiments of the present disclosure are described hereinafter in detail with reference to the accompanying drawings in order for a person having ordinary knowledge in the art to which the present disclosure pertains to easily carry out the present disclosure. However, the present disclosure may be implemented in various different ways, and is not limited to the embodiments described herein. In the drawings, in order to clearly describe the present disclosure, parts unrelated to the description are omitted, and similar reference numbers are used to refer to similar parts throughout the specification.

Terms used in this specification are briefly described, and embodiments of the present disclosure are described in detail.

Terms used in the present disclosure are common terms currently widely used and selected by taking into consideration functions in the present disclosure, but the terms may be changed depending on an intention of a technician skilled in the art, a precedent, or the advent of a new technology. Furthermore, in a specific case, some terms are randomly selected by the applicant. In this case, the meaning of a corresponding term will be described in detail in the corresponding description of the invention. Accordingly, terms used in the present disclosure should be defined based on their meanings and contents over the present disclosure, not the simple names of the terms.

Throughout the specification, unless explicitly described to the contrary, when any part "includes (or comprises)" another element, it indicates the further inclusion of other elements, not the exclusion of other elements. Furthermore, the term " . . . unit" or "module" described in the specification means a unit for processing at least one function or operation, and the unit or module may be implemented by hardware or software or a combination of hardware and software. Furthermore, throughout the specification, when it is described that one part is "connected" to another part, the one part may be "directly connected" to the another part or may be connected to the another part "with a still another part interposed therebetween."

Hereinafter, embodiments of the present disclosure are described in detail with reference to the accompanying drawings.

FIG. 1 is a block diagram of a system for analyzing a stool image according to an embodiment of the present disclosure.

Referring to FIG. 1, the system for analyzing a stool image according to an embodiment of the present disclosure may include an input unit 100, a data set generation unit 200, an analysis unit 300, and an output unit 400.

The input unit 100 may receive a stool image of a user. In this case, the stool image may mean a toilet image including the stool of the user, which is obtained through a user terminal.

The data set generation unit 200 may generate a data set by grouping the stool image in chronological order.

According to an embodiment, the data set may mean that stool images for seven days have been grouped as one data set right after a colonoscopy for a user. That is, the data set according to an embodiment of the present disclosure may include information related to a change in stool for seven days or information on the number of colonoscopies.

The analysis unit 300 may derive information on the stool state or state of the large intestine of the user by analyzing the data set.

In this case, the information on the stool state may include information on the color or texture of the stool. For example, the information on the color of the stool may include yellow, brown, red, or dark red, but the present disclosure is not limited thereto. The information on the texture of the stool may include diarrhea, normal, very stiff, stiff, slightly stiff, moderate, slightly watery, watery, or very watery, but the present disclosure is not limited thereto.

Furthermore, the information on the state of the large intestine may indicate a disease related to the large intestine and the degree of progress of the corresponding disease. For example, the information on the state of the large intestine may include information, such as initial colorectal cancer, the middle of colorectal cancer, a last stage of colorectal cancer, a mild case of colitis ulcerativa, a severe-middle case of colitis ulcerativa, a severe case of ulcerative colitis, or a serious case of colitis ulcerativa, but the present disclosure is not limited thereto.

The output unit 400 may output the information on the stool state or the information on the state of the large intestine. According to an embodiment, the output unit 400 may output the information on the stool state or the information on the state of the large intestine to a display unit included in a user terminal.

That is, the system for analyzing a stool image according to an embodiment of the present disclosure may be extended and applied to all of medical practices (e.g., the diagnosis, analysis, treatment, and examination of a disease and intestinal resection for a colonoscopy) related to the colonoscopy.

The system for analyzing a stool image according to an embodiment of the present disclosure may further include a pre-processing unit 500. Hereinafter, the pre-processing unit 500 according to an embodiment of the present disclosure is described with reference to FIGS. 2 and 3.

Figure 2:
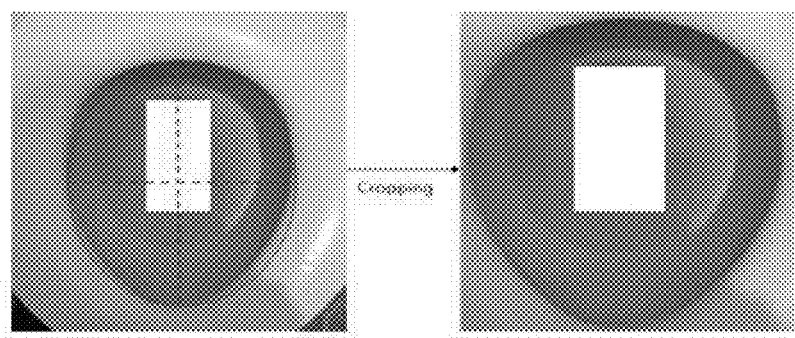
FIG. 2 is an example of a pre-processing process by a pre-processing unit according to an embodiment of the present disclosure.
Figure 2:
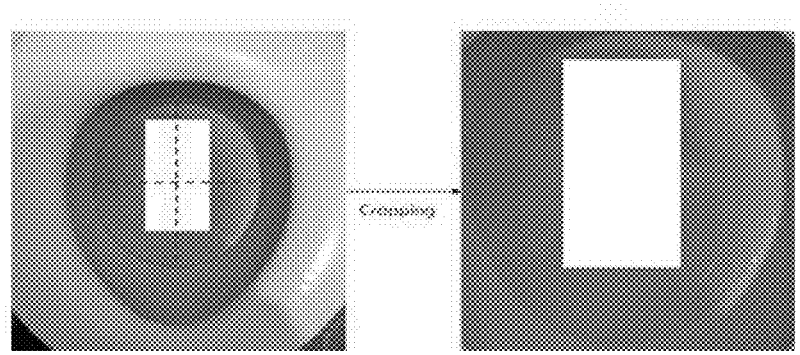

FIG. 2 is an example of a pre-processing process by the pre-processing unit 500 according to an embodiment of the present disclosure.

Referring to FIG. 2, the pre-processing unit 500 according to an embodiment of the present disclosure may crop a stool image on the basis of a specific point of a toilet, which is Included in the stool image.

In this case, cropping is one of photo editing techniques, and may mean that the size of a photo is trimmed based on a desired size.

According to an embodiment, the pre-processing unit 500 may extract a specific point of a toilet from a stool image, and crops the stool image so that any one of edges of the stool image includes the specific point of the toilet.

In this case, the specific point of the toilet may mean an internal elliptical shape of the toilet, among components of the toilet, or the edge of water that is present within the toilet.

FIG. 2(a) illustrates an image that is obtained by cropping a stool image on the basis of an internal elliptical shape of a toilet. FIG. 2(b) illustrates an image that is obtained by cropping a stool image on the basis of the edge of water that is present within a toilet.

Data of stool images that are obtained by users through their mobile cameras are greatly different (e.g., a distance or an angle) depending on the users, photographing places, or photographing times. Accordingly, if the state of the large intestine is analyzed based on data on which a pre-processing process has not been performed, the probability that an error may occur in the results of the analysis is great.

In contrast, the pre-processing unit 500 according to an embodiment of the present disclosure can reduce an error which may occur in the results of analysis of the state of the large intestine by reducing a difference between data, which may occur due to a higher degree of freedom for photographing in a data acquisition process.

Figure 3:
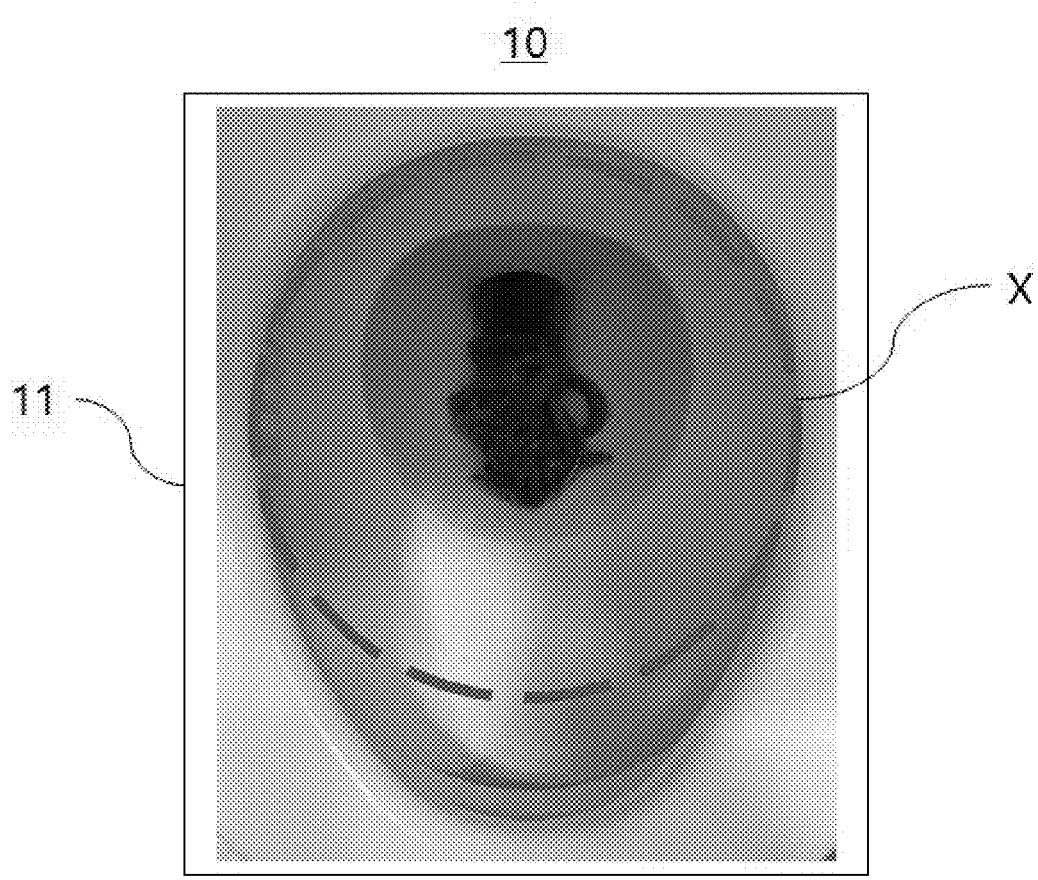
FIG. 3 illustrates the display unit of a user terminal including a guide line that is indicated through a communication unit according to an embodiment of the present disclosure.

FIG. 3 illustrates a display unit 11 of a user terminal 10 including a guide line that is indicated through a communication unit 600 according to an embodiment of the present disclosure.

The system for analyzing a stool image according to an embodiment of the present disclosure may further include the communication unit 600. The communication unit 600 is a component for performing communication with an external device, such as the user terminal.

According to an embodiment, the communication unit 600 may be connected to an external electronic device over a network that is implemented through wired communication and/or wireless communication.

In this case, the wired communication may include at least one of communication methods using Ethernet, an optical network, a universal serial bus (USB), and ThunderBolt.

Furthermore, the wireless communication may include at least one of communication methods using long term evolution (LTE), LTE Advance (LTE-A), $5^{th}$ generation (5G) mobile communication, code division multiple access (CDMA), wideband CDMA (WCDMA), a universal mobile telecommunications system (UMTS), a wireless broadband (WiBro), global system for mobile communications (GSM), time division multiple access (DMA), Wi-Fi, Wi-Fi Direct, Bluetooth, near field communication (NFC), and Zigbee.

Referring to FIG. 3, the communication unit 600 according to an embodiment of the present disclosure may transmit and receive stool images to and from the user terminal 10 including the display unit 11. The display unit 11 may include a guide line "x" for being matched with a specific point within a toilet.

Figure 4:
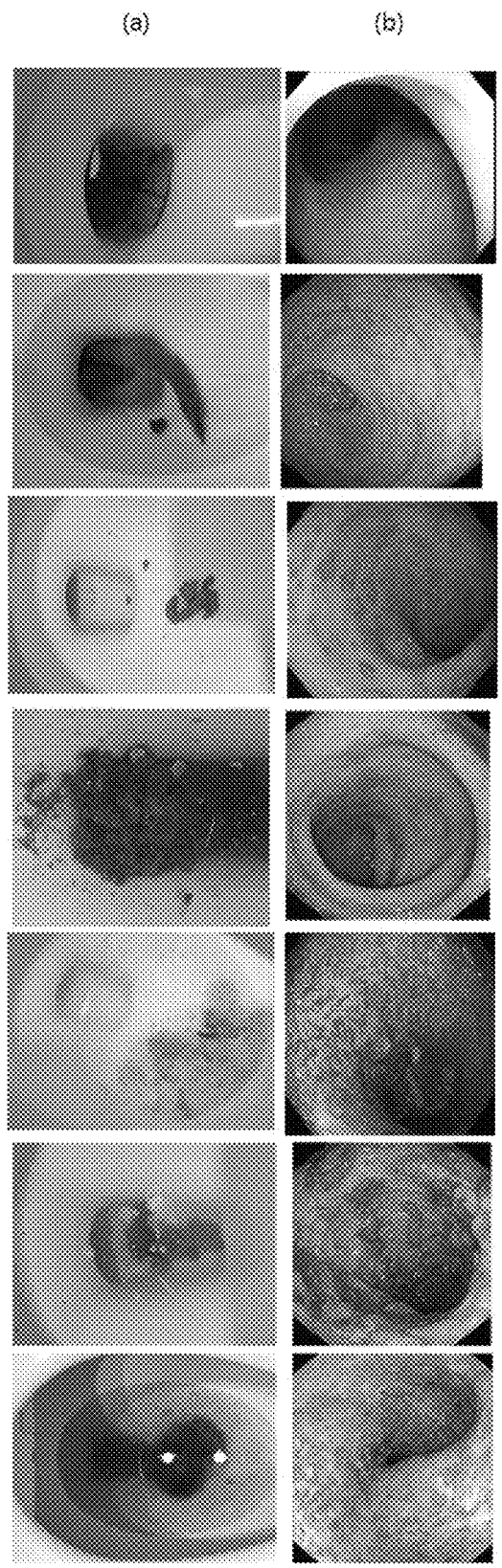
FIG. 4 is an example of training data for a deep learning model according to an embodiment of the present disclosure.

FIG. 4 is an example of training data for a deep learning model according to an embodiment of the present disclosure.

FIG. 4(a) illustrates input data for training the deep learning model. FIG. 4(b) illustrates endoscope images of a user corresponding to stool images illustrated in FIG. 4(a), respectively.

According to an embodiment, the analysis unit 300 may include a deep learning model that has been pre-trained by using the stool images or the data set as input data and using information on a stool state or information on the state of the large intestine as output data.

According to an embodiment, when receiving specific input data, the deep learning model may be trained to output specific output data that has been matched with the specific input data. That is, after a stool image and corresponding stool or information on the state of the large intestine are matched as input data and output data, the deep learning model may be trained.

According to an embodiment, the stool image may mean an image that is obtained by an image photographing apparatus, such as a camera included in the user terminal 10, and may mean an image that is obtained by capturing stool that is present in a toilet, as in FIG. 4(*a*), for example.

Referring to FIGS. 4(*a*) and 4(*b*), it may be seen that the stool state of the user is associated with a state of the large intestine of the user. Accordingly, information on the health state of the large intestine can be known by analyzing the state of the stool of the user.

According to an embodiment, the information on the stool state may include discontinuous values, such as a Mayo score, the number of stools, bloody excrement, a Mayo endoscopic subscore, PGA, UCEIS, a vascular score, a bleeding score, and an Erosion/Ulcer score, and continuous values, such as WBC, Hb, Platelet, ESR, serum albumin, and CRP. The information on the stool state may be used as output data in order to train the deep learning model.

For example, the output data may be constructed like Table 1 or Table 2,

TABLE 1

Discontinuous value

| Mayo score | Number of stools | Bloody excrement | Mayo endoscopic subscore | PGA | UCEIS | Vascular score | Bleeding score | Ero |
|---|---|---|---|---|---|---|---|---|
| 5 | 1 | 1 | 2 | 1 | 3 | 1 | 0 | 2 |
| 0 | 0 | 0 | 0 | 0 | 0 | 0 | 0 | 0 |
| 4 | 1 | 0 | 3 | 0 | 3 | 1 | 0 | 2 |
| 0 | 0 | 0 | 0 | 0 | 0 | 0 | 0 | 0 |
| 2 | 0 | 0 | 2 | 0 | 3 | 2 | 0 | 1 |
| 7 | 3 | 1 | 2 | 1 | 3 | 2 | 0 | 1 |
| 8 | 3 | 1 | 2 | 2 | 4 | 2 | 1 | 1 |

TABLE 2

Continuous value

| WBC (1,000/mm$^3$) | Hb (g/dL) | Platelet (1,000/mm$^3$) | ESR (mm/hr) | serum albumin (g/dL) | CRP (mg/dL) |
|---|---|---|---|---|---|
| 8.21 | 13.5 | 277 | 37 | 4.7 | <0.06 |
| 5.85 | 13.4 | 206 |  | 4.5 | <0.06 |
| 4.81 | 11.6 | 392 |  | 4.1 | 0.37 |
| 5.45 | 13 | 210 | 25 | 4.9 | 0.1 |
| 7.69 | 13.3 | 308 | 40 | 4.6 | 0.3 |
| 5.57 | 11.8 | 400 |  | 4.9 | 0.06 |
| 7.06 | 13 | 457 | 31 | 4.5 | 0.08 |

Figure 5:
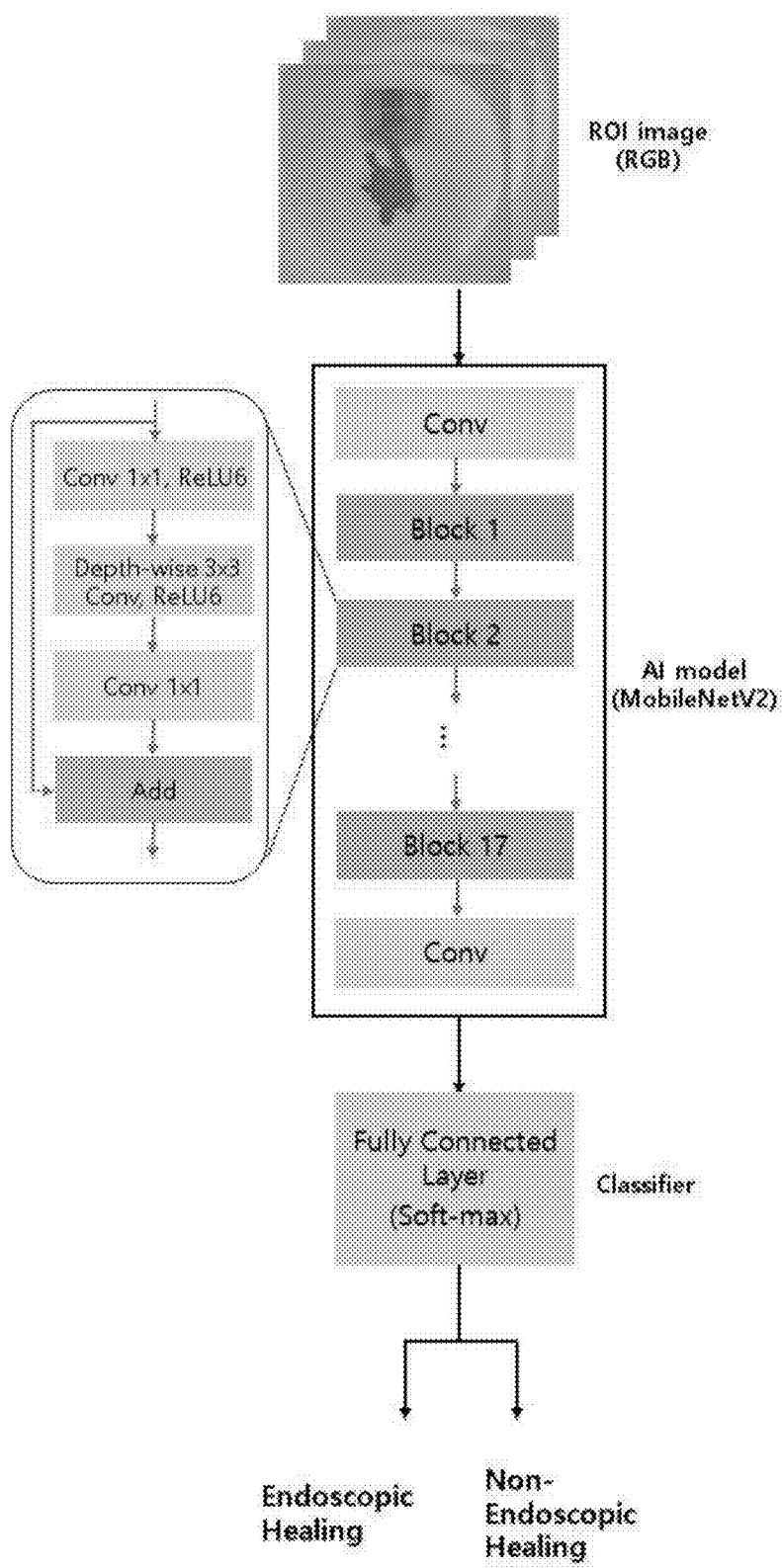
FIG. 5 illustrates a structure of a deep learning model that performs learning by using a loss function corresponding to a classification problem.
Figure 6:
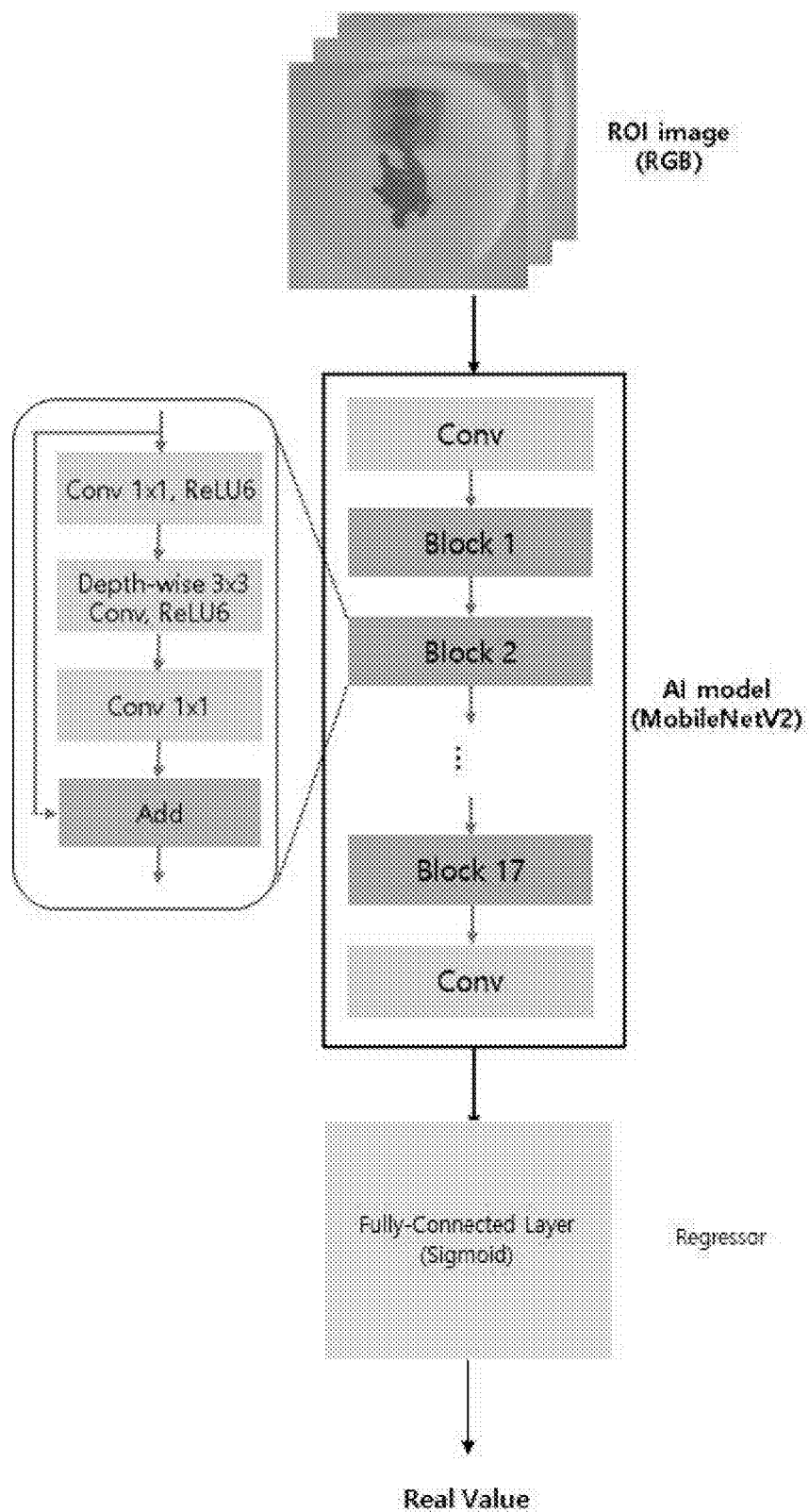
FIG. 6 illustrates a structure of the deep learning model that performs learning by using a loss function corresponding to a linear regression problem (or a mean square error).

FIG. 5 illustrates a structure of the deep learning model that performs learning by using a loss function corresponding to a classification problem. FIG. 6 illustrates a structure of the deep learning model that performs learning by using a loss function corresponding to a linear regression problem (or a mean square error).

Referring to FIG. 5, when information on the state of the large intestine is a discontinuous value indicative of a degree of the state of the large intestine of the user, the pre-trained deep learning model according to an embodiment of the present disclosure ray perform learning by using a loss function corresponding to a classification problem (i.e., cross-entropy).

In this case, the discontinuous value may include information indicative of a degree of a state related to the large intestine (e.g., a degree of colitis ulcerativa), but the present disclosure is not limited thereto.

Referring to FIG. 6, when information on the state of the large intestine is a continuous value indicative of a specific numeral value, the pre-trained deep learning model according to an embodiment of the present disclosure may perform learning by using a loss function corresponding to a linear regression problem.

In this case, the continuous value may include information indicative of an accurate numerical value related to the health state of the large intestine of a user, but the present disclosure is not limited thereto.

Figure 7:
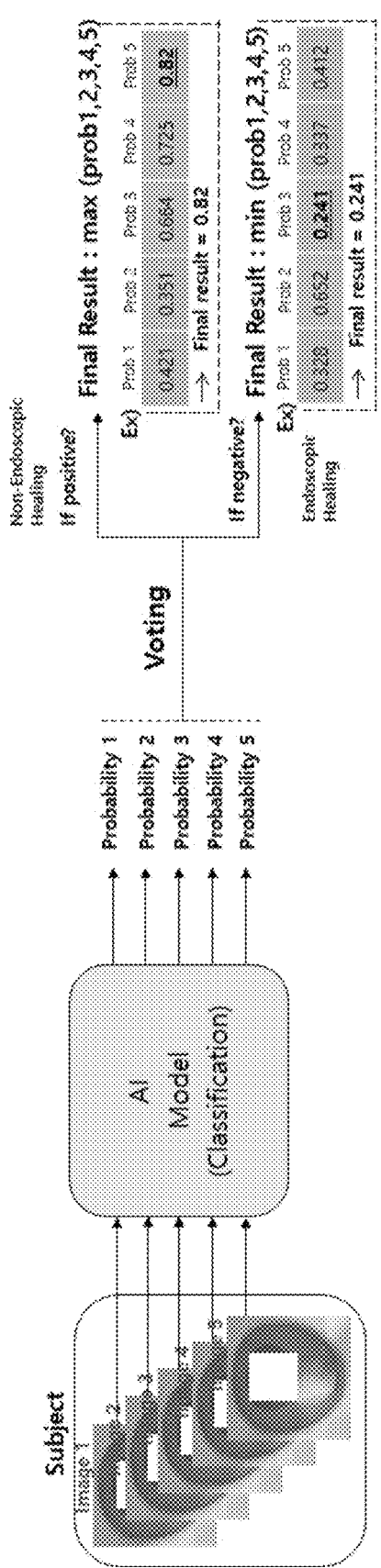
FIG. 7 is an exemplary diagram of a process of evaluating the state of the large intestine of a user by using the deep learning model that has been trained by using a loss function corresponding to a classification problem.

FIG. 7 is an exemplary diagram of a process of evaluating the state of the large intestine of a user by using the deep learning model that has been trained by using a loss function corresponding to a classification problem.

When data having stool state images for a certain period of time as one data set is input to the deep learning model that has been trained by using a loss function corresponding to a classification problem according to an embodiment of the present disclosure, the deep learning model may obtain output data (corresponding to probabilities 1 to 5 in FIG. 7) corresponding to the stool state images, respectively. In this case, the output data correspond to discontinuous values. Whether a specific disease is present in the large intestine may be evaluated based on values of the output data.

For example, when a value of each output data satisfies a specific criterion (e.g., the value is evaluated to be abnormal (indicated in red) when the probability is greater than in FIG. 7), the state of the large intestine may be evaluated to be abnormal.

Furthermore, according to an embodiment, whether a specific disease is present in the large intestine may be evaluated, based on whether an average value of a plurality of output data satisfies a specific criterion or the number of output data that satisfy a specific criterion, among a plurality of output data.

For example, the evaluation of whether the state of the large intestine is normal or abnormal may be derived based on the number of probabilities equal to or greater than 0.5, among the probabilities 1 to 5 in FIG. 7.

Figure 8:
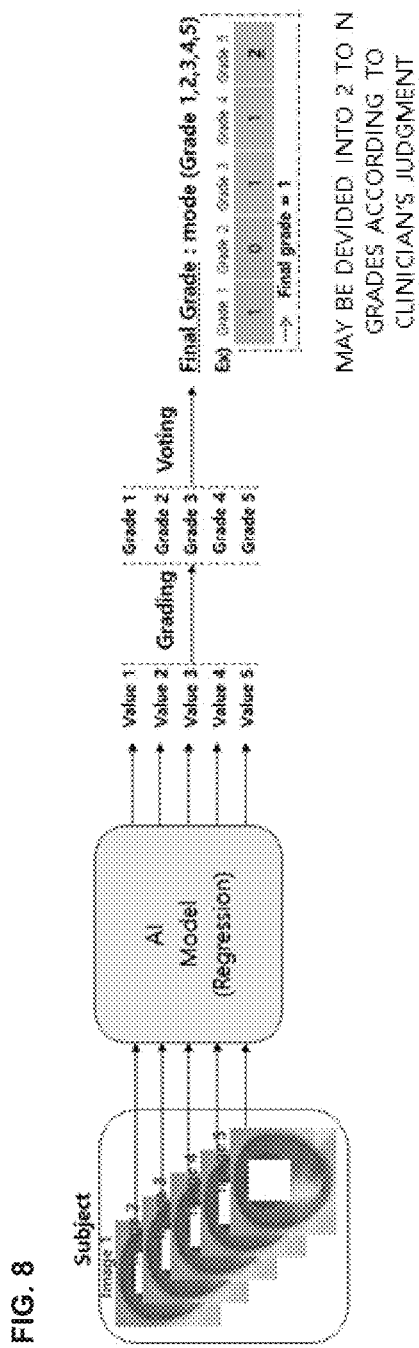
FIG. 8 is an exemplary diagram of a process of evaluating the state of the large intestine of a user by using the deep learning model that has been trained by using the loss function corresponding to the linear regression problem.

FIG. 8 is an exemplary diagram of a process of evaluating the state of the large intestine of a user by using the deep learning model that has been trained by using a loss function corresponding to a linear regression problem.

When data having stool state images for a certain period of time as one data set is input to the deep learning model that has been trained by using a loss function corresponding to a linear regression problem according to an embodiment of the present disclosure, the deep learning model may obtain output data (corresponding to values 1 to 5 in FIG. 8) corresponding to the stool state images, respectively.

In this case, the output data correspond to continuous values, and may be used as a criterion for determining whether the output data correspond to a specific disease after experiencing a grading process, That is, the output data (i.e., the values) may be divided into 2 to N grades according to a clinician's judgment.

For example, the output data of the deep learning model that has been trained by using the loss function corresponding to the linear regression problem may be divided into Grade 0 to Grade 2 as illustrated in FIG. 8.

Furthermore, according to an embodiment, whether a specific disease is present in the large intestine may be evaluated based on whether the grades of a plurality of output data satisfy a specific criterion or the number of grades that satisfy a specific criterion, among the grades of a plurality of output data.

In relation to a method according to an embodiment of the present disclosure, the aforementioned contents of the system may be applied. Hereinafter, a description of the same contents as the aforementioned contents of the system in relation to the method is omitted.

Figure 9:
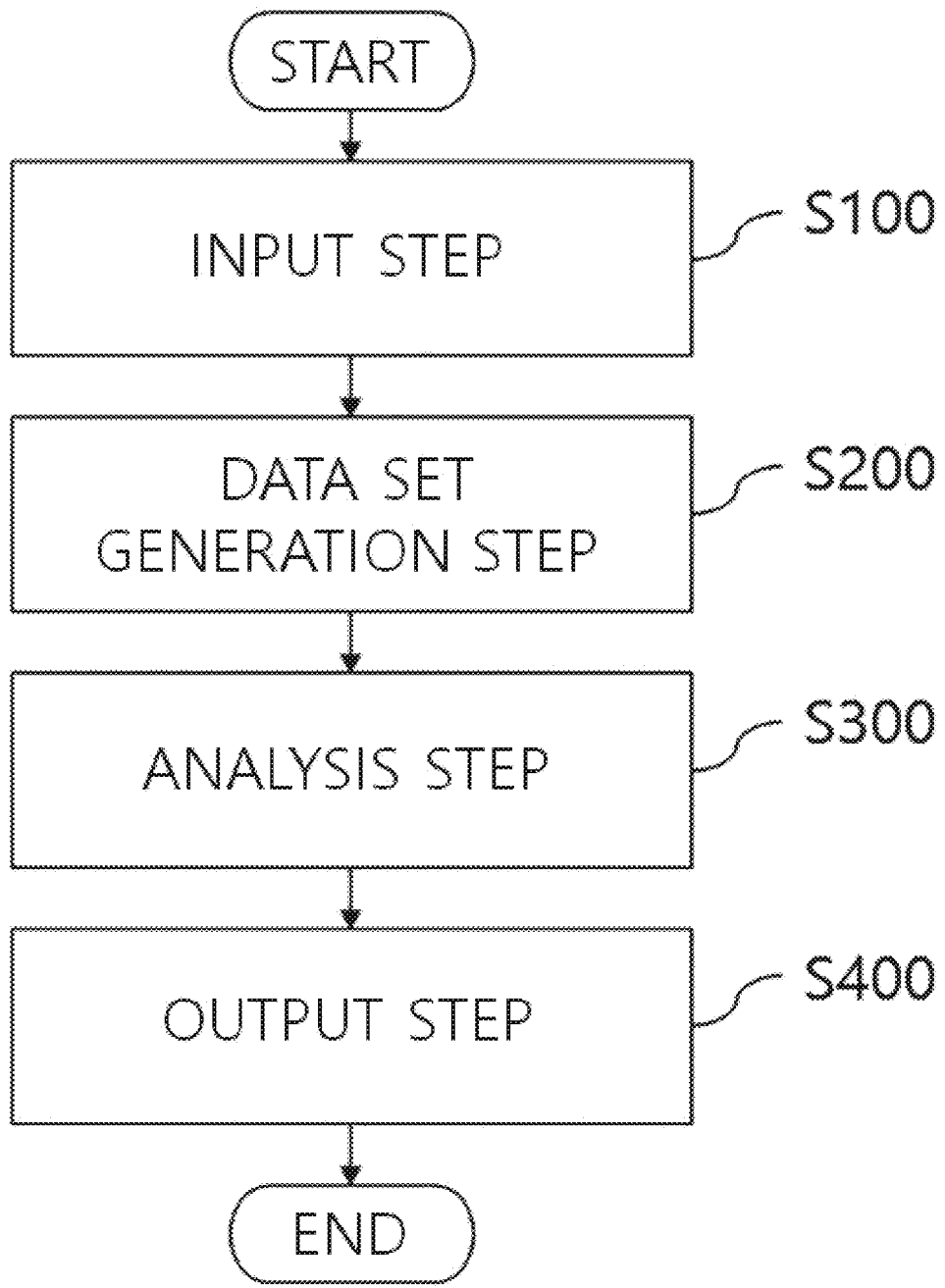
FIG. 9 is a flowchart of a method of analyzing a stool image according to an embodiment of the present disclosure.

FIG. 9 is a flowchart of a method of analyzing a stool image according to an embodiment of the present disclosure.

Referring to FIG. 9, the method of analyzing a stool image according to an embodiment of the present disclosure may include an input step S100, a data set generation step S200, an analysis step S300, and an output step S400.

In the input step S100, the input unit 100 may receive stool images of a user.

In the data set generation step S200, the data set generation unit 200 may generate a data set by grouping the stool images in chronological order.

According to an embodiment, the data set may include stool images for seven days right after a colonoscopy for the user.

In the analysis step S300, the analysis unit 300 may derive information on the stool state or information on the state of the large intestine of the user by analyzing the data set.

In the output step S400, the output unit 400 may output the information on the stool state or the information on the state of the large intestine.

The method of analyzing a stool image according to an embodiment of the present disclosure may further include a pre-processing step.

In the pre-processing step, the pre-processing unit 500 may crop the stool image on the basis of a specific point of a toilet, which is included in the stool image.

According to an embodiment, the pre-processing step may further include a reference extraction step and a cropping step.

In the reference extraction step, the pre-processing unit 500 may extract the specific point of the toilet from the stool image.

In the cropping step, the pre-processing unit 500 may crop the stool image so that any one of edges of the stool image includes the specific point of the toilet.

The method of analyzing a stool image according to an embodiment of the present disclosure may further include a transmission and reception step and a guide line indication step.

In the transmission and reception step, the communication unit 600 may transmit and receive the stool images to and from the user terminal 10 including the display unit 11.

In the guide line indication step, the display unit 11 may display a guide line "x" for being matched with the specific point within the toilet.

The method of analyzing a stool image according to an embodiment of the present disclosure may further include a training step.

The training step may include training the deep learning model by using the stool images or the data set as input data and using the information on the stool state or the information on the state of the large intestine as output data.

According to an embodiment, in the training step, when the information on the state of the large intestine is a discontinuous value indicative of a degree of the state of the large intestine of the user, the deep learning model may be trained by using a loss function corresponding to a classification problem.

According to an embodiment, in the training step, when the information on the state of the large intestine is a continuous value indicative of a specific numeral value, the deep learning model may be trained by using a loss function corresponding to a linear regression problem.

The aforementioned method may be written in the form of a computer-executable program, and may be implemented in a general-purpose digital computer that drives the program by using a computer-readable recording medium. Furthermore, the structure of data used in the aforementioned method may be recorded on a computer-readable recording medium through several means. The computer-readable recording medium includes storage media, such as magnetic storage media (e.g., ROM, RAM, a USB, a floppy disk, and a hard disk) and optical recording media (e.g., a CD-ROM and a DVD).

The description of the present disclosure is illustrative, and a person having ordinary knowledge in the art to which the present disclosure pertains will understand that the present disclosure may be easily modified in other detailed forms without changing the technical spirit or essential characteristic of the present disclosure. Accordingly, it should be construed that the aforementioned embodiments are only illustrative in all aspects, and are not limitative. For example, elements described in the singular form may be carried out in a distributed form. Likewise, elements described in a distributed form may also be carried out in a combined form.

The scope of the present disclosure is defined by the appended claims rather than by the detailed description, and all changes or modifications derived from the meanings and scope of the claims and equivalents thereto should be interpreted as being included in the scope of the present disclosure.

DESCRIPTION OF REFERENCE NUMERALS

| | |
|---|---|
| X: guide line | 10: user terminal |
| 11: display unit | 100: input unit |
| 200: data set generation unit | |
| 300: analysis unit | |
| 400: output unit | 500: pre-processing unit |
| 600: communication unit | |

What is claimed is:
1. A system for analyzing a stool image, comprising:
an input unit configured to receive stool images of a user;
a data set generation unit configured to generate a data set by grouping the stool images in chronological order;
an analysis unit comprising a deep learning model that has been pre-trained by using the stool images or the data set as input data and using information on a stool state of the user or information on a state of a large intestine as output data, and configured to derive the information on the stool state of the user or the information on the state of the large intestine of the user by analyzing the data set; and an output unit configured to output the information on the stool state or the information on the state of the large intestine, wherein, when the information on the stool state or the information on the state of the large intestine is a discontinuous value, including the Mayo score or UCEIS, indicative of a degree of the state of the large intestine of the user, the pre-trained deep learning model performs learning by using a loss function corresponding to a classification problem, wherein, when the information on the stool state or the information on the state of the large intestine is a continuous value, including WBC, Hb, Platelet, ESR, serum albumin or CRP, indicative of a specific numerical value, the pre-trained deep learning model performs learning by using a loss function corresponding to a linear regression problem.

2. The system of claim 1, wherein the data set comprises the stool images for seven days right after a colonoscopy for the user.

3. The system of claim 1, further comprising a pre-processing unit configured to crop the stool image based on a specific point of a toilet included in the stool image.

4. The system of claim 3, wherein the pre-processing unit extracts the specific point of the toilet from the stool image and crops the stool image so that any one of edges of the stool image includes the specific point of the toilet.

5. The system of claim 1, further comprising:
a user terminal comprising a display unit, and
a communication unit configured to transmit and receive the stool images,
wherein the display unit comprises a guideline for being matched with a specific point within a toilet.

6. A method for analyzing a stool image, comprising:
an input step of receiving, by an input unit, stool images of a user;
a data set generation step of generating, by a data set generation unit, a data set by grouping the stool images in chronological order;
an analysis step of deriving, by an analysis unit, information on a stool state or state of a large intestine of the user by analyzing the data set;
an output step of outputting, by an output unit, the information on the stool state or the information on the state of the large intestine; and
a training step of training a deep learning model by using the stool images or the data set as input data and using the information on the stool state of the information on the state of the large intestine as output data
wherein, in the training step, the deep learning model is trained by using a loss function corresponding to a classification problem when the information on the stool state or the information on the state of the large intestine is a discontinuous value, including the Mayo score or UCEIS, indicative of a degree of the state of the large intestine of the user, and
wherein, in the training step, the deep learning model is trained by using a loss function corresponding to a linear regression problem when the information on the stool state or the information on the state of the large intestine is a continuous value, including WBC, Hb, Platelet, ESR, serum albumin or CRP, indicative of a specific numerical value.

7. The method of claim 6, wherein the data set comprises the stool images taken over seven days immediately after a colonoscopy for the user.

8. The method of claim 6, further comprising a pre-processing step of cropping, by a pre-processing unit, the stool image based on an elliptical shape included in the stool image.

9. The method of claim 8, wherein the pre-processing step comprises:
a reference extraction step of extracting, by the pre-processing unit, a specific point of a toilet from the stool image; and
a cropping step of cropping, by the pre-processing unit, the stool image so that any one of edges of the stool image comprises the specific point of the toilet.

10. The method of claim 6, further comprising:
a transmission and reception step of transmitting and receiving, by a communication unit, the stool images to and from a user terminal comprising a display unit, and
a guideline indication step of displaying, by the display unit, a guideline for being matched with a specific point within a toilet.

11. A non-transitory computer-readable recording medium on which a program for implementing the method according to claim 9 has been recorded.

* * * * *